(12) United States Patent
MacMillan et al.

(10) Patent No.: US 6,278,707 B1
(45) Date of Patent: Aug. 21, 2001

(54) PLATFORM FOR COUPLING A CIRCUIT-SWITCHED NETWORK TO A DATA NETWORK

(75) Inventors: Ian MacMillan, Plano; Frederick A. Sherman, Mesquite; Ranga Dendi, Plano; Dale Gil Read, Carrollton, all of TX (US)

(73) Assignee: MCI communications Corporation, Washington, DC (US)

( * ) Notice: Subject to any disclaimer, the term of this patent is extended or adjusted under 35 U.S.C. 154(b) by 0 days.

(21) Appl. No.: 09/165,249

(22) Filed: Oct. 1, 1998

Related U.S. Application Data

(63) Continuation-in-part of application No. 09/003,977, filed on Jan. 7, 1998, now Pat. No. 6,208,657.

(51) Int. Cl.[7] .................... H04L 12/66; H04L 12/56
(52) U.S. Cl. .................... 370/352; 370/466; 370/522
(58) Field of Search .................... 370/385, 465, 370/466, 467, 352, 353, 356, 410, 522; 379/90.02, 229, 230; 375/222

(56) References Cited

U.S. PATENT DOCUMENTS

| | | | |
|---|---|---|---|
| 5,418,844 | 5/1995 | Morrisey et al. | 379/207 |
| 5,467,390 | 11/1995 | Brankley et al. | 379/229 |
| 5,923,659 | 7/1999 | Curry et al. | 370/401 |
| 5,923,671 | * 7/1999 | Silverman | 370/542 |
| 5,940,598 | 8/1999 | Strauss et al. | 395/200.79 |
| 5,978,387 | 11/1999 | Sherman | 370/468 |
| 5,995,606 | * 11/1999 | Civanlar et al. | 370/352 |
| 5,999,526 | * 12/1999 | Garland et al. | 370/352 |
| 6,014,379 | * 1/2000 | White et al. | 370/389 |
| 6,046,762 | * 4/2000 | Sonesh et al. | 348/16 |
| 6,047,005 | * 4/2000 | Sherman et al. | 370/522 |
| 6,064,653 | * 5/2000 | Farris | 370/237 |
| 6,128,379 | * 10/2000 | Smyk | 379/230 |

OTHER PUBLICATIONS

3 Com and DSC to Provide New Solutions for Internet Access Based on SS7 Network Control, Jul. 7, 1997.
Digital Loop Carrier, May 18, 1998.

* cited by examiner

Primary Examiner—Chau Nguyen
Assistant Examiner—Soon-Dong Hyun

(57) ABSTRACT

A communication system includes an interface between two networks, for example the public telephone system and an IP-based network. The system includes a modem bank which receives bearer channel inputs and provides outputs to the second network. A protocol converter interfaces with a signaling network such as a common channel signaling (CCS) network (e.g., an Signaling System 7 network). The protocol converter communicates signaling information to the modem bank. A resource manager is coupled to the protocol converter and includes a memory which stores status information relating to the system.

20 Claims, 5 Drawing Sheets

PLATFORM FOR COUPLING A CIRCUIT-SWITCHED NETWORK TO A DATA NETWORK

This is a continuation-in-part of patent application Ser. No. 09/003,977 filed Jan. 7, 1998, now U.S. Pat. No. 6,208,657. This patent application is assigned to the assignee of the present application and is hereby incorporated by reference as if reproduced in its entirety.

CROSS-REFERENCE TO RELATED APPLICATIONS

The following U.S. patents and/or commonly assigned patent applications are hereby incorporated herein by reference:

| U.S. Pat. No. or Ser. No. | Filing Date | Issue Date (U.S. Pat. No.) | Attorney Docket No. |
| --- | --- | --- | --- |
| 08/751,203 | 11/18/96 | | VON-96-001 |
| 08/798,350 | 02/10/97 | abandoned | VON-97-004 |
| 09/003,977 | 01/07/98 | 6,208,657 | RIC-96-099 |
| 09/004,157 | 01/07/98 | 6,108,337 | RIC-96-132 |
| 09/004,153 | 01/07/98 | 6,047,005 | RIC-96-133 |

FIELD OF THE INVENTION

This invention relates generally to telecommunications and specifically to a platform for coupling a circuit-switched network to a packet-switched network.

BACKGROUND OF THE INVENTION

The public Internet has become an extremely popular source of information and vehicle for communications. Each day, millions of people log on to the numerous available web sites. Nearly every major company as well as many small companies and even individuals have web sites which allow the general public to visit. Every indication leads one to believe this trend will only continue to grow.

Physically, the Internet is a huge, global network spanning nearly 100 countries and comprising a great number of academic, commercial, government, and military networks. Each of the computers on this network uses the data network protocol TCP/IP (Transmission Control Protocol/Internet Protocol). Some users have direct access to the Internet. In other words, these users have computer systems which are connected via dedicated transmission facilities connecting the users at access points provided by Internet service providers, typically at speeds of 1,536 mbps and above.

Many other users, however, must connect to the Internet through an Internet service provider (ISP) via circuit switched access at speeds below 56 kpbs. An ISP can receive communications from a user's computer through a modem connected over the Public Switched Telephone Network (PSTN). The ISP owns equipment that provides an interconnection from a circuit-switched network to a packet switched network. There is a need to make the connection from the PSTN to the Internet more efficient.

One common method of Internet connectivity is over the Public Switched Telephone Network (PSTN). The PSTN was designed for voice traffic for an average hold time of about three minutes. Internet traffic using the voice network, on the other hand, has an average hold time of about thirty-five minutes and is constantly growing. For example, the 1997 average hold time of twenty minutes has grown to thirty-eight minutes in about a year. The problem is further exacerbated by the fact that peak traffic periods of the Internet and Voice traffic overlap. These factors cause congestion at high concentration points in the network and an inefficient use of the existing network, which is not optimized for Internet traffic.

FIG. 1 illustrates a block diagram of a common method of connection from computer (PC) 10 to Internet 12. The computer 10 is coupled to a modem 14. The modem generates signals which can be transported along the PSTN 16 where the necessary switching occurs so that a connection is made to a network access server (NAS) 17. In particular, PSTN 16 utilizes a number of switches including class 3 and class 5 switches. The PSTN may be operated by a local telephone company, e.g., a regional Bell operating company (RBOC), and NAS 17 is controlled by an Internet Service Provider (ISP). The ISP also owns computer hardware such as routers and servers which are linked to the Internet 12.

One of the problems associated with the system of FIG. 1 is the high cost of communications between the switch (such as switch 22 in FIG. 2) and NAS 17. This connection is usually made using a POTS (plain old telephone service) or ISDN (integrated services digital network) connection. These systems typically use channel associated signaling and tend to be very expensive.

FIG. 2 illustrates an alternative prior art system which will lower the cost of communication between computer 10 and Internet 12. In this case, NAS 17 has been located physically near to switch 22, which is typically a class 5 switch. Since the cost of the link between NAS 17 and switch 22 is distance sensitive, total cost can be lowered by locating the two components closely.

This same concept applies where more than one local exchange carrier controls the switches 15, 22. In that case, communications from modem 14 go first to incumbent local exchange carrier (ILEC) and from there to competitive local exchange carrier (CLEC). For example, the ILEC may be a local telephone company such as one of the RBOCs (regional Bell operating companies). The CLEC may be another carrier such as MCI or AT&T.

In the prior art, the class 5 switch causes network congestion. With increasing hold times, this congestion may cause impacts to community related (e.g., public) services such as 911 if the carrier does not closely monitor switch capacity and utilization.

Another disadvantage of the prior art is that it makes very inefficient use of class 5 switch 22. The class 5 switch has many capabilities which are not utilized or required by the system of FIG. 1. While the system of FIG. 2 has advantages over that of FIG. 1 because of the reduced communication cost, it still requires a class 5 or similar switch and does not address the problem of network congestion.

SUMMARY OF THE INVENTION

In one aspect, the present invention takes calls destined for Internet Service Providers (ISPs) and diverts the calls to a platform, which is optimized to handle this type of traffic. In various aspects, this invention uses innovative integration of signaling systems, numbering plans, data communications and switching systems. This invention can also be applied to any type of voice network call traffic.

In a preferred embodiment, a communication system includes an interface between two networks, for example the public telephone system and an IP-based network. The system includes a network access server or digital signal processor (DSP) bank (e.g., modem bank) which receives bearer channel inputs from one network and provides outputs to the second network. A protocol converter interfaces with a signaling network such as a common channel signaling (CCS) network (e.g., a Signaling System 7 or SS7 network). The protocol converter communicates signaling information to the DSP bank. A resource manager is coupled to the protocol converter and includes a memory which stores status information relating to the system.

This method is technically advantageous because of the increased bandwidth being consumed by the Internet users. As the Internet usage continues to increase, congestion will increase and the number of failed calls will increase. Many other methods of decreasing the impact of the Internet on competitive local exchange carriers are costly and inefficient. The solution provided by this architecture is an advantageous solution.

One advantage of the present invention is its flexibility. A platform of the type described herein has the ability to support a number of diverse applications. In addition to the signaling point (SP) used as the example this platform has the ability to support IP, telephony (including fax as well as voice services), conferencing ports, and digital communications. The present invention also supports call origination as well as call termination. Other applications include dial-up video (e.g., multicasting and H.323/H.324 video gateway services as just two examples), operator services and others if desired.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

The present invention will now be described with reference to FIGS. 3–7. An overview of the present invention will first be described. More specific embodiments are then described followed by a discussion of how the system operates. These examples will make it clear that the present invention can be utilized in a number of applications including connection to the Internet (or any other network such as a virtual private network) over voice lines or internet telephony (e.g., voice over Internet Protocol or fax over IP).

Figure 1:
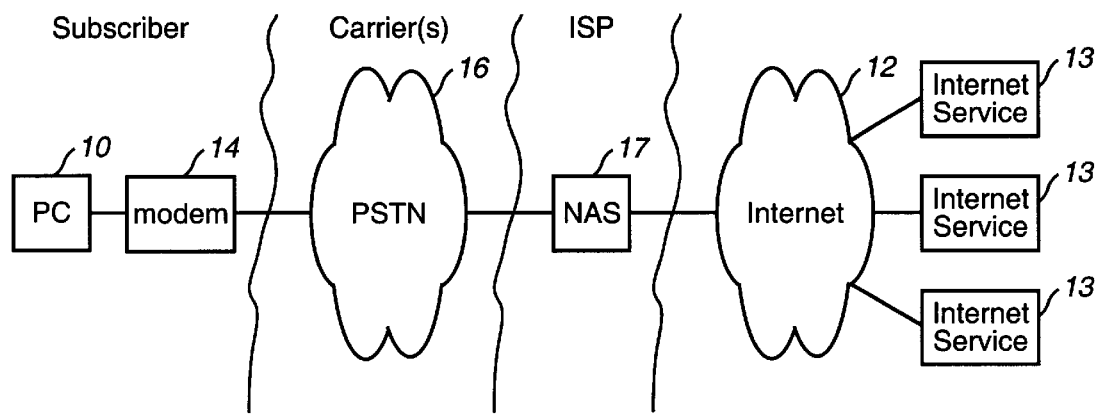
FIG. 1 is a prior art communication system.
Figure 2:
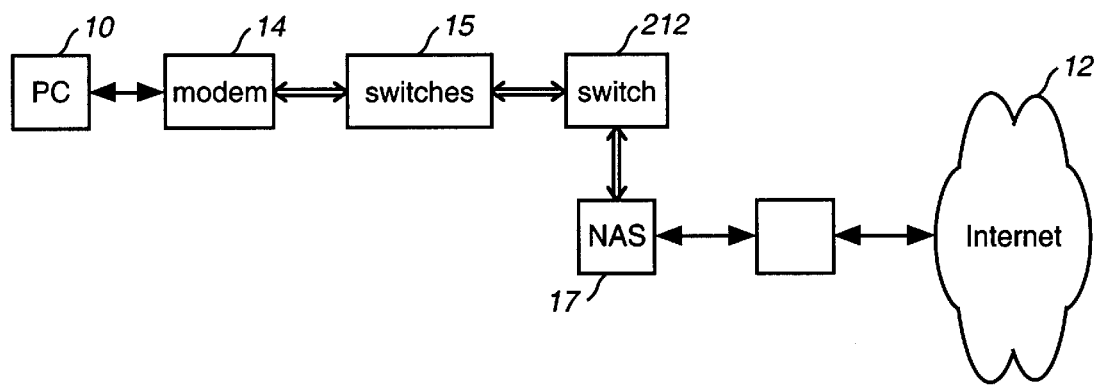
FIGS. 2 is another prior art communication system which includes advantages compared to the system of FIG. 1.
Figure 3:
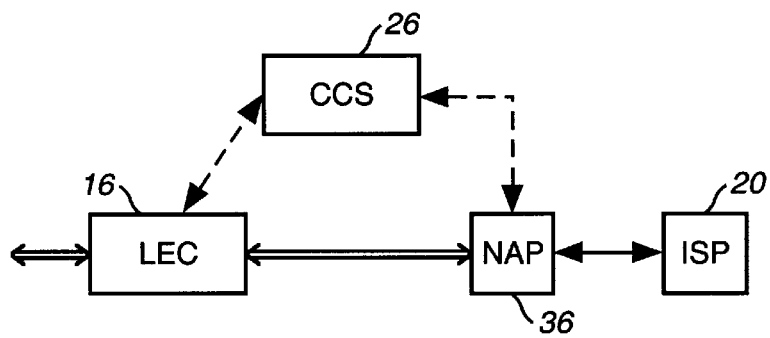
FIG. 3 is a block diagram of a preferred embodiment system of the present invention.

Referring first to FIG. 3, an overview of a first preferred embodiment will be described. The improved communication system of FIG. 3 does not require a class 5 switch. The preferred embodiment of the present invention utilizes a signaling network 26 referred to as common channeling signaling (CCS), for example using Signaling System 7 (SS7). CCS is known in the art. For a general understanding of an SS7 signaling network, the reader is referred to Travis Russell, *Signaling System#7* (McGraw-Hill: New York), ISBN 0-07-054991-5.

A CCS network 26 is made up of various switching devices and interconnecting links. One of the CCS network's purposes is to transfer signaling information used for the interconnection of communication paths between devices. The CCS network 26 used in this example is made up of switching transfer points (STP) and service switching points (SSP). Within CCS network 26, "A Links" (not shown, see FIG. 6) transport SS7 messages between SSPs and STPs for call connection and management functions.

A switching transfer point (STP) is a packet switch that provides CCS message routing and transport. An STP typically includes stored programmed switches that use information contained in the message in conjunction with information stored in memory to route the message to the appropriate destination signaling point.

A service switching point (SSP) generates call related and/or connection related messages to route information to other SSPs. In the following description one of the SSPs is the protocol converter 24 (see, e.g., FIG. 4 or 5) used by the network access platform (NAP) 34. In the preferred embodiment, protocol converter 24 appears to the network to be an signaling point.

In one aspect, the present invention diverts the Internet traffic from the voice network, e.g., the public switched telephone network (PSTN). To do this the Internet traffic must be routed around the voice switches (e.g., Class 3 or Class 5). This is accomplished by creating a network access platform (NAP) 36 that accepts the Internet calls and provides connectivity to the Internet service provider (ISP) 20.

To direct calls for the Internet to the bypass platform, it is necessary to establish an Office (NXX) code for the platform. Each Internet Service Provider has a local number that is made up of the NXX+XXXX. This number can be the dialed number or a translated number. In the preferred embodiment, this called number will be used to direct the call to the network access platform. The present invention also applies to NNX codes (e.g., 555)

Figure 4:
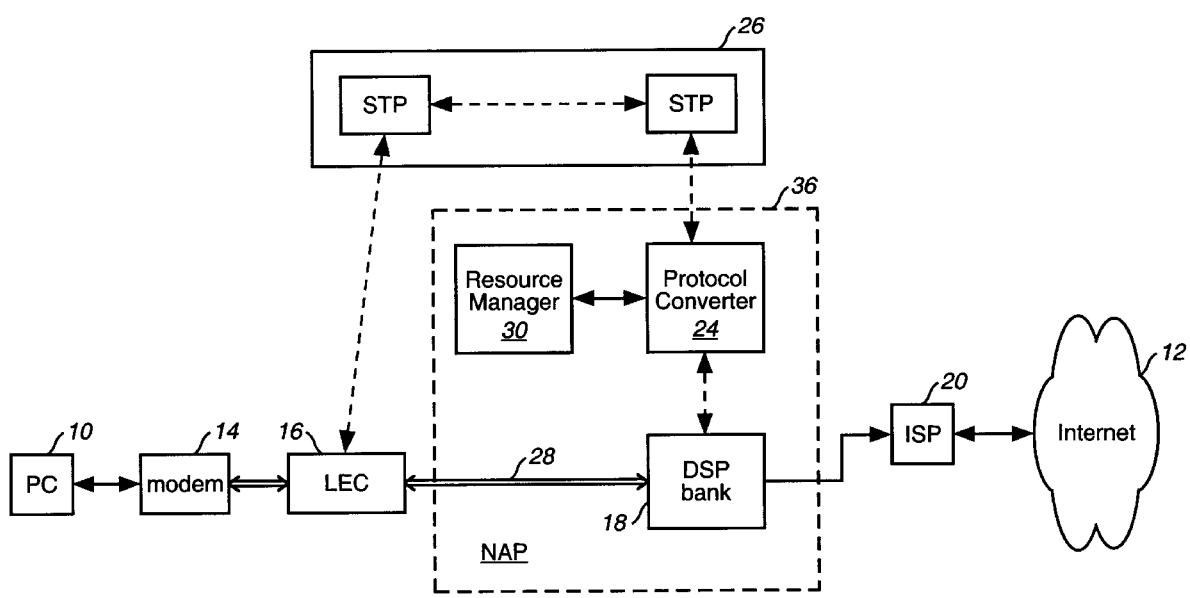
FIG. 4 is a block diagram of a first embodiment system of the present invention.

FIG. 4 illustrates a first preferred embodiment communication system which includes a network access platform 36. Network access platform 36 serves as an interface between the circuit-switched telephone network (represented by LEC 16 and CCS 26) and the packet switched data network (represented by ISP 20 and network 12). Network access platform 36 includes a protocol converter 24, a resource manager 30 and DSP bank 18. Each of these elements as well as the surrounding elements will now be described in greater detail.

The modern telephone network is controlled by a signaling network referred to as Signaling System 7 (SS7) or Common Channel Signaling (CCS). The communications to DSP bank 18 should be isolated from the CCS network 26 and also be in a protocol DSP bank 18 understands.

Protocol converter 24 will perform the call setup and take down that is required by the CCS network 26. Protocol converter 24 is also responsible for the signaling network and bearer channel management. These responsibilities are well defined by domestic and international standards. Since protocol converter 24 is responsible for signaling it can also be referred to as a signaling gateway (or SS7 gateway when SS7 signaling is used).

Communications between protocol converter 24 and DSP bank 18 utilize a protocol with the ability to establish connections between the bearer channels 28 and one of the modems in the DSP bank 18. The protocol should preferably be able to transport management information ensuring the cohesiveness of operation between the network access platform 36 and the CCS network 26. In the preferred embodiment TCP/IP is used but other protocols can alternatively be used.

In the preferred embodiment, protocol converter 24 is a software application running on a computer system to control the necessary elements of the communications system. For example, protocol converter 24 may run on anything from a desktop PC to a fault-tolerant multi-processing computer system.

The system of FIG. 4 also includes a resource manager 30, which is a platform managing a large number of objects. The resource manager 30 is preferably a software application running on either the same or a different computer as protocol converter 24. Once again this computer can range from a small computer (e.g., a desktop or even portable PC) to a powerful multiprocessor computer or computers. For either software application 24 or 30, the specific hardware is not as important as the functional operation of that hardware.

In the preferred embodiment, resource manager 30 manages objects such as modems and supporting devices or applications. The resource manager 30 also provide a dynamic database. This database represents the status of the modems, bearer channels, CCS link connections, internal communications, and egress communications. Additionally, resource manager 30 preferably provides status for the supporting devices and applications, such as protocol converter 24 and elements making up the modem bank 18.

Communications between an Internet subscriber and the Internet service provider are preferably through the use of modems (modulation/demodulation devices). Since the modem function is preferably performed using digital signal processors, the modem bank has thus far been referred to as digital signaling processing bank (DSPB) 18. It is noted, however, that DSPs are not necessarily required by the present invention and the term DSP bank or DSP device is meant to include any and all devices and systems which perform a the modulation/demodulation functions utilized by the various embodiments of the present invention.

The DSP bank 18 may be implemented as a network access server (NAS). An NAS is a device based on digital signal processors (DSPs). Software is written to control the manner in which the DSP processes a signal. This technique provides flexibility in the implementation.

A modem bank 18 includes a large number (e.g., 672 to 20,000 or more) of modems connected to the telephone network providing an interface between the subscribers and the provider. Modem banks 18 vary in configuration from vendor to vendor. Modem banks 18 provide bearer channel connectivity in the form of DS0 (64,000 bits/sec digital transmission interface), DS1 (24×DS0), DS 3 (28×DSI), or PRI (ISDN Primary Rate Interface). Note that a PRI is really a DS1 with the difference that the DS1 uses in-band signalling while the PRI uses channel associated signalling. Further, a PRI can reside on a DS3, which terminates in the NAS. Examples of commercially available modem banks 18 include the Ascend Max TNT, Bay Networks 5399, 3COM Total Control, as well as others by vendors such as Cisco, Lucent and others.

Different levels of management and reporting can be built into DSP bank 18. The preferred embodiment requires communications with protocol converter 24. Through the use of a common protocol, modem bank 18 will act on and respond to call control and management messaging. Call control includes setting up calls on an individual basis while management includes controlling the bearer channel interface according to availability of modems. This function would include taking modems out of service and putting modems into service, as well as tone generation for end-users and SS7 continuity checks.

This additional functionality gives DSP bank 18 the ability to function as an element in the CCS network 26. While most of the intelligence is built into protocol converter 24 and resource manager 30, DSP bank 18 also has some level of intelligence. It is anticipated that as technology moves forward this level of intelligence may increase in the future.

The connection from DSP bank 18 to ISP 20 can take on a number of forms. For example, subscriber connectivity from the digital signal processor bank 18 to the ISP 20 can be, via point to point IP links, Frame Relay, or ATM (asynchronous transfer mode) networks. These three layer 2 applications can be delivered to ISP 20 by DS1, NxDS1 (i.e., inverse multiplexing), DS3 or SONET (synchronous optical network).

Additional functionality can be added to DSP bank 18. The functionality is aided by the addition of protocol converter 24 and resource manager 30. For example, the system can include a SONET interface. This SONET interface provides OC3 connectivity to modem bank 18 from the voice network. An OC-3 carries the equivalent of three DS3s of circuit switched traffic. The main difference between the two is that the digital signal hierarchy systems use electrical signaling (e.g., use wire) while OC3 is SONET based and therefore uses fiber optic cable. Using the higher speed interfaces significantly reduces the amount of cabling between the elements (16>18) and therefore significantly reduces the costs. Parent application Ser. No. 09/003,977 addresses other aspects of why moving to OC3 or higher SONET speeds is advantageous. Accordingly, the parent application is incorporated herein by reference.

It would now be useful to describe the connection between the user modem 14 and the system of FIG. 4. This connection can be referred to as "subscriber access," where the subscriber is the party which requests Internet access from the Internet service provider. The subscriber typically operates a computer (e.g., PC) 10 that includes either an integrated modem 14 or a modem 14 coupled, for example, via an RS232 port. Alternatively, the subscriber may have an integrated ISDN terminal adapter. The subscriber also has a phone or ISDN connection to the local exchange carrier (LEC) 16. The user-to-network interface is typically POTS or ISDN BRI. The LEC 16 routes the connection through a switch (not explicitly shown) to the network access point (NAP) 36 using the called party number. This connection may typically utilize an interoffice trunk (for example, SS7 feature group D or FGD).

Since the preferred embodiment of the present invention uses out-of-band signaling, two connections are made to the network access platform 36. Signaling is provided from the common channel signaling (CCS) network 36. The actual voice or data travels along bearer channel 28.

The bearer channel 28 between local exchange carrier 16 and network access platform 36 can be DS0, DS1, or DS3. DS0 and DS1 can typically interface directly to DSP bank 18. With some equipment, DS3 will be unable to interface directly since only a small number of vendors will interface to DS3.

A flexible method is SONET since this method can combine all DS0s, DS1s, and DS3s from the local exchange carrier 16 to the network access platform 36. The SONET connectivity gives bearer channel connectivity to all modems on the platform and will be described in greater detail below with respect to FIG. 5. Virtual bearer channel connectivity is also described in parent application Ser. No. 09/003,977, which is incorporated herein by reference. For the sake of simplicity, the numerous details described in the parent application are not explicitly repeated herein but nonetheless are treated as being included in the present description.

Signaling access is used for call control, network management and management of the subscriber access lines (bearer channels) 28. The preferred embodiment utilizes a common channel signaling (CCS) network 26 which is connected to the protocol converter 24. The CCS interface is well defined by international and domestic standards organizations.

The connection between the network access platform 36 and the Internet service provider (ISP) 20 can utilize DS-1, DS-3, SONET, ATM (asynchronous transfer mode), Frame Relay, and/or any other communication transport. The type of connectivity used depends on the preference of the ISP 20 and the availability of the transport medium.

Platform communications occur between protocol converter 24 and the network access server (NAS) or DSP bank 18. The protocol converter 24 can be either co-located or remotely located relative to DSP bank 18. In this context, components are co-located when they are at the same physical location and are remotely located when they are not. The preferred communication transport protocol selected for this platform is TCP/IP, although other protocols can be used. This configuration gives the system the ability to do connection setup and management of the platform using a well defined messaging protocol. The preferred protocols are Enterprise Computer Telephony Forum S.200, IETF SIP, ITU H323, ITU Q.931 and MCI Switch Protocol (a proprietary protocol). Each of these protocols has the ability to perform the required functions.

Telephone numbers are becoming scarce resources. An NXX code is assigned to the platform from the numbering plan in order for other switches or carrier networks to properly route calls to the platform (e.g., 308-xxxx). This scheme allocates a block of ten thousand numbers to the platform. In most applications, however, the platform does not require that many telephone numbers. To minimize the number of telephone numbers required, Local Number Portability (LNP) can be used to return the unused numbers from the office code for use on other switching systems in the network.

Figure 5:
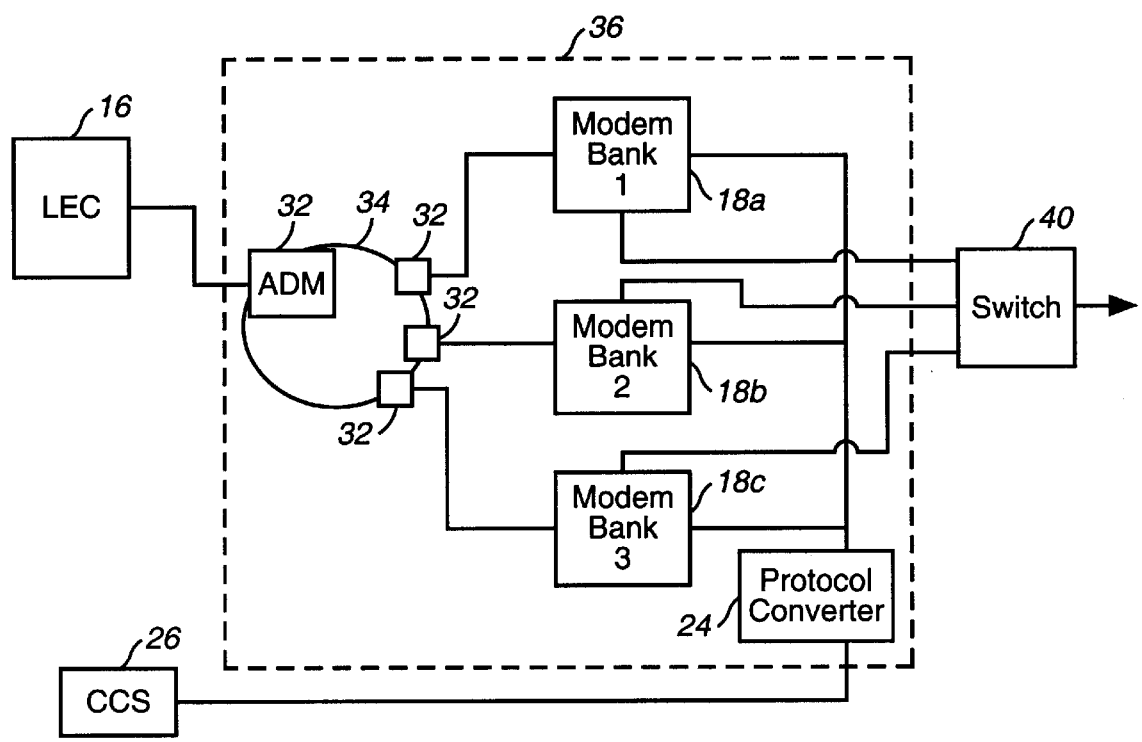
FIG. 5 is a block diagram of a second embodiment system of the present invention.

FIG. 5 illustrates another embodiment of the present invention. In this embodiment, a virtual bearer channel is utilized. Once again, further reference can be made to the parent case for additional detail on virtual bearer channel. As the system becomes very large, it is not possible to produce a DSP bank 18 which is large enough to provide connections for all of the lines. Therefore, DSP bank 18 is split into a number of modem banks 18a–18c. While there is still only one logical DSP bank as se en by other components such as resource manager 30, there are three physical units 18a–18c.

FIG. 5 illustrates three DSP banks 18. But the system of the present invention can be utilized with any number of banks. There is no preferred number of DSP banks 18. The number depends on the number of ISP customers who want to have connections and therefore is market/traffic driven. If OC3 is utilized, however, there is a limit of 2016 ports because that is the number of DS0's in an OC3. Each vendor has a different number of ports they can accommodate in a single modem bank. For redundancy purposes, the minimum number is two and the maximum is vendor dependent.

It is noted however that the present invention is not limited to OC3. There is no reason why this architecture could not be extended to the OC12, OC48, OC192, and above as the technology becomes available.

In the embodiment of FIG. 5, the equivalent of three DS-3 lines circle around a SONET ring. Since each DS-3 line can transport 45 Mbits/sec, if one of the lines or modem banks fail for some reason, then a large amount of capacity is lost. In the embodiment of FIG. 5, however, if one of the lines or modem banks fail, the protocol converter 24 can switch the traffic to the other two modem banks.

The bearer channel 28 signals are received at add drop multiplexor (ADM) 32. ADM 32 is used to connect a lower speed interface such as a DS1 or DS3 to a high speed OC3 network.

Figure 6:
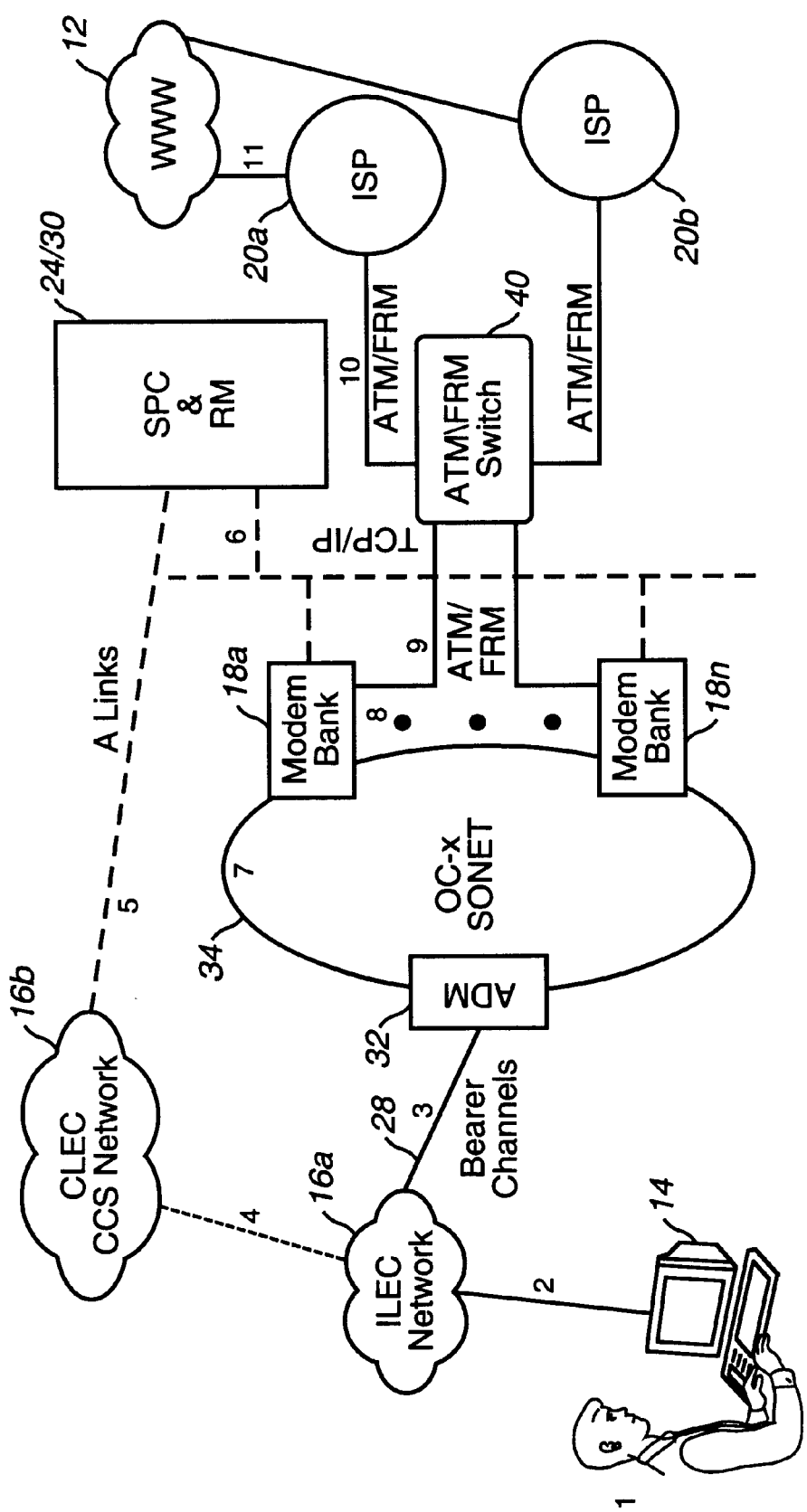
FIG. 6 is a fairly specific example of a communication system provided for the purpose of illustrating how the system will operate.

The operation of the preferred embodiment of the present invention will now be described with respect to FIG. 6. FIG. 6 illustrates a fairly specific example of a network access platform connected to the signaling and data networks. Eleven steps are shown in the figure and described below. The signaling has been simplified for this example. In reality there is a much more complex series of messages required for call setup and user verification. Further, this example does not cover disconnecting the connection. These steps can be performed in a conventional manner.

1. An Internet user establishes a connection to the incumbent local exchange carrier (ILEC) 16a. This connection is typically established by initiating a call using a modem 14 coupled (internally or externally) with the user's computer.

2. The user sends the number of the service provider 20 to the incumbent local exchange carrier (ILEC) 16a. This step occurs when modem 14 dials the internet service provider telephone number.

3. The incumbent local exchange carrier (ILEC) 16a selects an outgoing trunk (bearer channel) toward the network access platform (NAP). The NAP is part of the CLEC's network.

4. The incumbent local exchange carrier (ILEC) 16a sends a CCS message to the competitive local exchange carrier (CLEC) 16b with the information collected from the user, circuit identification and, if necessary, translated information. Note that the CLEC is defined as the SS7 network only in the context used.

5. The competitive local exchange carrier (CLEC) 16b directs the CCS message to the signaling protocol converter (SPC) 24.

6. The protocol converter (SPC) 24, using information from the resource manager (RM) 30, selects a modem from modem bank 18 then converts the CCS message to a ECTF S.200 or ITU Q.931 (the ISDN signaling standard as defined by ITU and ANSI) message and transports it over TCP/IP to the modem bank 18. When utilized, the Q.931 should be extended beyond the standard to meet the needs of this platform (e.g., continuity testing and management messaging between protocol converter 24 and modem bank 18).

7. The bearer channel 28 referred to in step 3 has been placed on a SONET ring 34 in a defined location. This location is stored in a database accessible by resource manager (RM) 30 and is identified in the message sent to the modem bank 18. This location can be dynamically switched, for example if one of the modem banks 18 fails.

8. The DSP bank 18 is now connected to the ISP 20 via an appropriate data network such as ATM or Frame Relay Switch 40. The ATM or frame relay to the ISP is typically (although not necessarily) based on permanent virtual circuits (PVCs), not switched virtual circuits (SVC).

9. The ATM or Frame Relay switch 40 will direct the connection to the Internet service provider (ISP) 20.

10. The Internet service provider (ISP) will verify the user by various parameters. For example, most ISPs provide subscribers with a user ID and password. These identification items can be compared with information in a database controlled by the ISP. In this manner, the ISP can regulate who gains access to its network.

11. After approval the Internet service provider (ISP) will connect the user to the World Wide Web (WWW) or another network.

To this point, the present invention has been described with reference to access of the public Internet. In this context, the "Internet" (uppercase "I") is used to connote the worldwide collection of interconnected networks that uses Internet Protocol (IP) to link a large number of physical networks into a single logical network. Physically, the Internet is a huge, global network spanning nearly 100 countries and comprising a great number of academic, commercial, government, and military networks.

The invention, however, also applies to a broad number of other embodiments where a user can connect into any type of network. For example, the network 12 could comprise an internet which is not connected to the public Internet. In this context, an "internet" (lowercase "i") is any collection of separate physical networks, interconnected by a common protocol, to form a single logical network. An internet would preferably, but not necessarily use Internet Protocol. An internet which is owned by a single entity is sometimes referred to as an intranet or virtual private network. Network 12 can comprise an intranet, which is or is not connected to the Internet.

A platform of the type described herein has the ability to support a number of diverse applications. In addition to the system signaling point (SSP) example described above, this platform has the ability to support IP telephony such as voice over IP (VOIP) or fax over IP (FOIP). In this application, a call generated from a standard phone can terminate to a computer or vice-versa. Alternatively, a call can be generated at a telephone, routed to an IP-based network, and then routed back to a telephone device at the called party's location.

Figure 7:
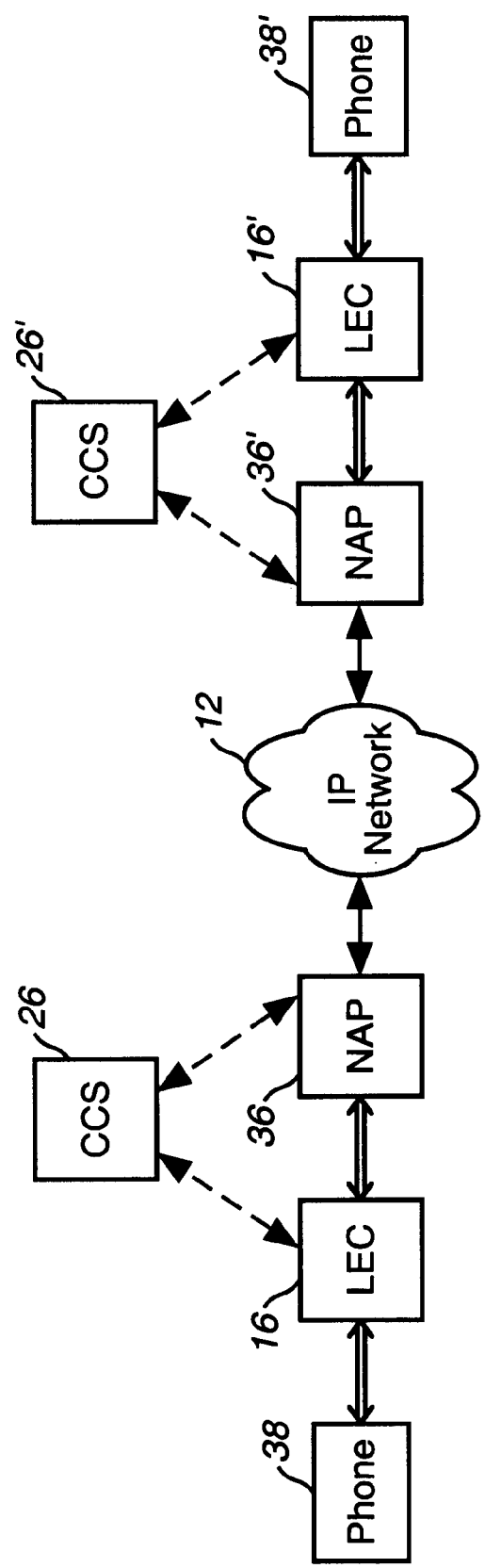
FIG. 7 is a block diagram of an IP telephony embodiment system of the present invention.

FIG. 7 illustrates a simplified example of an IP telephony system. First, a telephone device 38 initiates a call to local exchange carrier 16. This call gets routed to a network access platform 36 as described above. Note that any of the variations of network access platforms 36 described herein or deviations thereof can be utilized. The network access platform 36 provides the voice signals to an IP-based network 12. For example, digitized voice packets can be sent across the public Internet.

IP network 12 is coupled to another network access platform 36', which is preferably physically closer to receiving telephone 38'. The second network access platform 36' be configured like the first platform 36 or they can be different. For example, platform 36 can be a system as in FIG. 4 while platform 36' is a system as shown in FIG. 5.

In addition, the present invention can be used with conferencing ports. For example, the systems described herein provide the ability to conference a group of bearer channels together. With respect to digital communications, the described architecture can facilitate diverse communications across a network.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A communication system coupled between a first network and a second network, the system comprising:
   a digital signal processor (DSP) bank including a plurality of modem banks, each modem bank comprising a plurality of modems, the DSP bank being configured to couple each of a plurality of bearer channel inputs to the second network via one of the plurality of modems;
   a protocol converter coupled to the DSP bank and to the first network, the protocol converter configured to receive common channeling signals from the first network and output control information to the DSP bank based on the received common channeling signals; and
   a resource manager coupled to the protocol converter, the resource manager including a database configured to maintain status information relating to the status of the modems in the DSP bank and the bearer channel inputs, the protocol converter utilizing the status information to control the DSP bank.

2. The system of claim 1 wherein the first network comprises a common channel signal (CCS) network.

3. The system of claim 2, further comprising the CCS network.

4. The system of claim 1 wherein the protocol converter is operable to control the switching of bearer channels to the DSP bank.

5. The system of claim 1 wherein the protocol converter communicates with the DSP bank using TCP/IP.

6. The system of claim 1 wherein the protocol converter and the resource manager each comprise software applications operating on a computer system.

7. The system of claim 6 and wherein the protocol converter and the resource manager operate on the same computer system.

8. The system of claim 1 wherein outputs from the DSP bank are coupled to at least one of a packet based data network and a cell based data network.

9. The system of claim 1 wherein each of the bearer channel inputs of the DSP bank is coupled to a SONET ring.

10. A communication system comprising:
   means for modulating and demodulating signals received from a bearer channel;
   means for interfacing with a signaling network and controlling the means for modulating and demodulating in accordance with signals received from the signaling network; and
   means for maintaining the status of the modulating and demodulating means and for communicating the status to the interfacing means, the interfacing means utilizing the status to control the modulating and demodulating means.

11. A communications system comprising:
a digital signal processing device receiving at least one bearer channel input and at least one control input; and
a processor coupled to the digital signal processing device, the processor configured to receive common channeling signals, control the digital signal processing device in accordance with the common channeling signals, manage calls received by the digital signal processing device, access a database comprising stored status information relating to the status of modems within the digital signal processing device, the status of bearer channels coupled to the digital signal processing device and the status of common channel signal links and manage resources within the digital signal processing device in accordance with stored status information.

12. The system of claim 11 wherein the digital signal processing device comprises a modem bank.

13. The system of claim 11 wherein the common channeling signals comprise SS7 signals.

14. The system of claim 11 wherein the digital signal processing device processes a call between the public switched telephone network and an IP-based data network.

15. The system of claim 14 wherein the IP-based data network comprises the Internet.

16. The system of claim 11 wherein the at least one bearer channel input of the digital signal processing device is coupled to a SONET ring.

17. A network access device for interfacing between a circuit-switched network and a packet-switched network, the network access device comprising:
a memory configured to store status information relating to at least one of modems, bearer channels, common channel signal (CCS) link connections, internal communications and outgoing communications associated with the network access device;
a digital signal processor (DSP) bank coupled to a plurality of bearer channels, the DSP bank configured to provide connections from the bearer channels to the packet-switched network;
a protocol converter configured to receive signaling information from a CCS system associated with the circuit-switched network and output information to the DSP bank; and
a resource manager coupled to the memory and configured to manage the network access device using the status information.

18. The network access device of claim 17, wherein the DSP bank is configured to provide connection from the bearer channels to the packet-switched network via at least one of point-to-point Internet Protocol (IP) links, a frame relay device and an asynchronous transfer mode (ATM) network.

19. In a network access platform including a database for storing status information relating to the network access platform, a method for coupling a user access line from a circuit-switched network to a packet-switched network, the method comprising:
connecting a user access line to a defined location in a SONET ring;
storing the defined location;
receiving a common channel signal input from a local exchange carrier;
selecting a modem from at least one modem bank based on the status information;
converting the common channel signal input into a format compatible with the modem bank;
transmitting a message to the modem bank, the message including information from the converted common channel signal input and information identifying the location of the selected modem;
coupling the selected modem to the packet-switched network; and
coupling the user access line to the packet-switched network via the selected modem.

20. The method of claim 19, further comprising:
switching the user access line to another modem if the modem bank fails.

* * * * *